United States Patent
Colburn et al.

(10) Patent No.: US 7,701,479 B2
(45) Date of Patent: Apr. 20, 2010

(54) SYSTEM AND METHOD FOR LASER WRITE POWER CALIBRATION

(75) Inventors: Kevin L. Colburn, Greeley, CO (US); Lawrence Nathaniel Taugher, Loveland, CO (US); D. Mitchel Hanks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1523 days.

(21) Appl. No.: 11/016,099

(22) Filed: Dec. 17, 2004

(65) Prior Publication Data
US 2006/0133239 A1 Jun. 22, 2006

(51) Int. Cl.
*B41J 2/435* (2006.01)
*G11B 11/00* (2006.01)

(52) U.S. Cl. .................. 347/224; 369/13.26

(58) Field of Classification Search .......... 347/224–225; 369/47.52, 47.53, 53.21, 53.23, 100, 116, 369/13.26, 13.27, 47.5, 47.55
See application file for complete search history.

(56) References Cited

U.S. PATENT DOCUMENTS

| | | | | |
|---|---|---|---|---|
| 5,185,733 A | * | 2/1993 | Finkelstein et al. | 369/47.52 |
| 5,268,893 A | * | 12/1993 | Call et al. | 369/47.52 |
| 5,341,360 A | * | 8/1994 | Johann et al. | 369/47.53 |
| 5,539,718 A | * | 7/1996 | Hoshi et al. | 369/100 |
| 5,745,461 A | * | 4/1998 | Kawasaki | 369/53.23 |
| 6,246,660 B1 | * | 6/2001 | Yanagawa | 369/116 |
| 6,538,968 B1 | | 3/2003 | Yamaguchi | |
| 6,845,070 B2 | * | 1/2005 | Seo | 369/47.53 |
| 6,940,790 B1 | * | 9/2005 | Powelson et al. | 369/47.15 |
| 6,967,915 B2 | * | 11/2005 | Lin | 369/47.53 |
| 7,187,637 B2 | * | 3/2007 | Pate et al. | 369/53.21 |
| 2002/0191517 A1 | | 12/2002 | Honda | |
| 2003/0179670 A1 | | 9/2003 | Fukushima | |
| 2003/0193864 A1 | | 10/2003 | Pate | |
| 2004/0051778 A1 | | 3/2004 | Bronson | |
| 2006/0092793 A1 | * | 5/2006 | Hanks et al. | 369/47.53 |

FOREIGN PATENT DOCUMENTS

EP 1575035 9/2005
WO WO 2005/063712 9/2005

OTHER PUBLICATIONS

International Search Report for PCT/US2005/038591, dated May 22, 2006, 2 pages.

* cited by examiner

*Primary Examiner*—Hai C Pham

(57) ABSTRACT

Systems and methods for calibrating laser write power in a digital media drive are disclosed. The method includes writing to a calibration portion on a digital media labeling layer with energy from a laser. The writing includes using at least two different laser power settings within the calibration portion. The method also includes measuring a parameter in the calibration segment, the parameter being indicative of the reflectivity of the labeling layer, and determining a calibrated laser write power setting based on the measured parameter and the at least two different laser write power settings.

22 Claims, 7 Drawing Sheets

SYSTEM AND METHOD FOR LASER WRITE POWER CALIBRATION

BACKGROUND OF THE INVENTION

The present invention relates generally to the field of media labeling. In particular, the invention relates to methods and systems for power calibration of a laser for media labeling.

Digital media, such as compact discs (CDs) or digital video discs (DVDs), are a popular form of storage media. Recently, writable digital media have become increasingly popular among users for storing personalized data, including creating their own set of musical compilations, pictures, etc. Once the user has stored or written digital data onto the medium, the user may label the medium by either writing on the medium by hand or affixing a printed label onto the medium using an adhesive.

More recently, systems have been developed for imprinting a labeling layer on a digital medium using a laser of the disc drive. In such systems, laser energy is applied to activate the labeling layer to produce either a grayscale or a color image. In such systems, application of the proper energy level through a corresponding laser power setting is critical. With too low power, the image formed may be faint and may fade with time. If too high of a power setting is used, ablation of the labeling layer may occur.

Determination of the appropriate laser power to use for such imprinting can be difficult. Typical calibration is performed by sensing the output power at the front sense diode of the laser unit. However, dust accumulation on the objective lens of the optical pick-up unit can hinder proper calibration using the front sense diode.

SUMMARY OF THE INVENTION

One embodiment of the invention relates to a method of calibrating laser write power. The method includes writing to a calibration portion on a digital media labeling layer with energy from a laser. The writing includes using at least two different laser power settings within the calibration portion. The method also includes measuring a parameter in the calibration portion, the parameter being indicative of the reflectivity of the labeling layer, and determining a calibrated laser write power setting based on the measured parameter and the at least two different laser write power settings.

Another embodiment of the invention relates to a digital media drive. The digital media drive includes a sensor adapted to measure a parameter indicative of reflectivity of at least a calibration portion of a digital media labeling layer. The digital media drive also includes a controller in communication with the sensor and adapted to determine a calibrated laser power setting based on measurements of the parameter at points within the calibration portion associated with at least two different laser write power settings.

It is to be understood that both the foregoing general description and the following detailed description are exemplary and exemplary only, and are not restrictive of the invention as claimed.

DETAILED DESCRIPTION OF CERTAIN EMBODIMENTS

Figure 1:
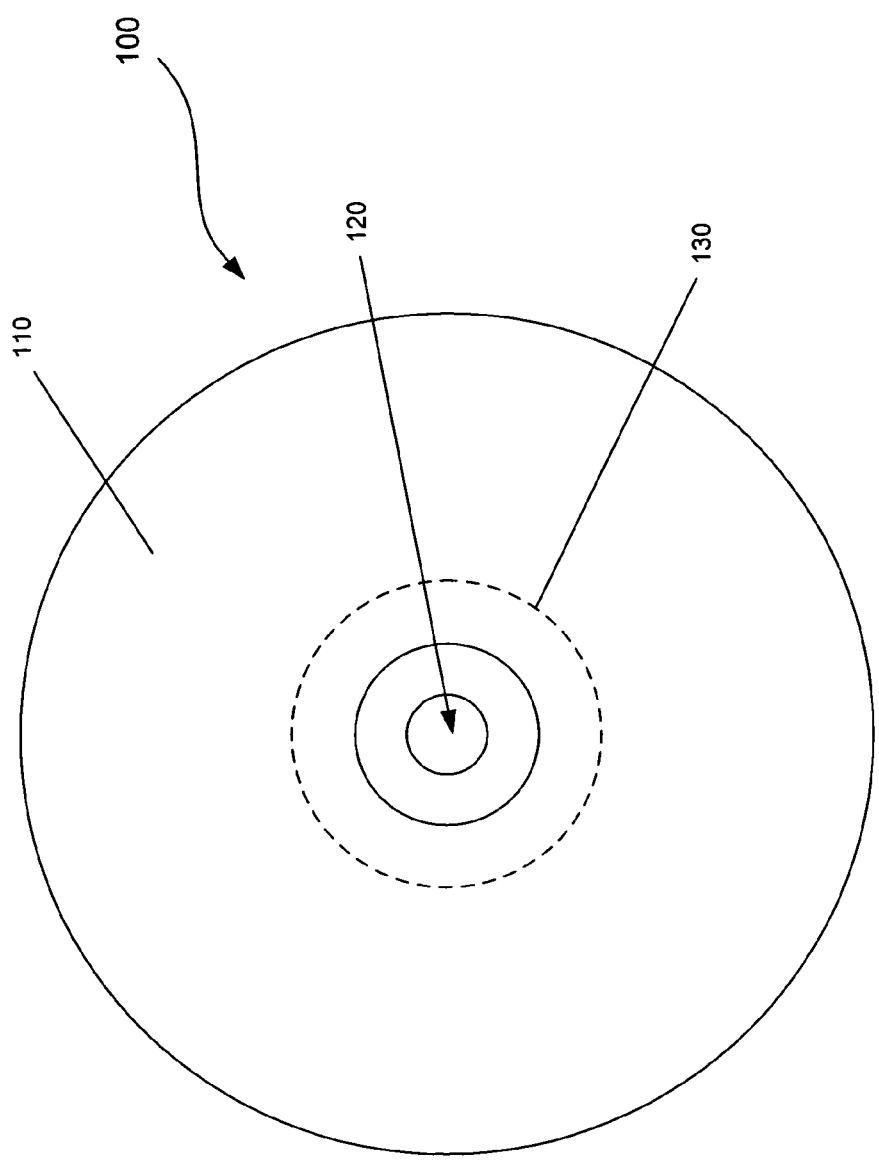
FIG. 1 is a top view of an embodiment of a digital medium.

Referring to FIG. 1, an exemplary digital medium is illustrated. The digital medium 100 may be an optical medium adapted to record and store digital information. The digital medium 100 may be a compact disc (CD), a digital video disc (DVD), a CD-ROM or a DVD-ROM, for example.

The digital medium 100 includes a labeling layer 110 on one surface. One such labeling layer 110 includes layer of laser-sensitive film on a disc and is described in U.S. Patent Application Publication No. 2003/0108708 A1, which is hereby incorporated by reference in its entirety. The energy in a laser causes the laser-sensitive film to change color, thereby producing an image. The digital medium 100 is provided with a central opening 120 for mounting the digital medium 100 onto a digital media drive, for example.

In one embodiment, the labeling layer 110 includes a laser-sensitive film that can be activated by laser energy. The laser-sensitive film may be adapted to produce either a grayscale or a color appearance when activated. In a particular embodiment, the a laser can activate the laser-sensitive film, which may be arranged as a single spiral track or a plurality of circular tracks, similar to the arrangement of digital data on a digital medium. Each track may be approximately 20 microns wide, for example.

In order to activate the various regions of the labeling layer 110 to form the desired image, an appropriate laser power setting should be selected. In other words, the laser power should be calibrated for the laser system and the digital medium 100. As noted above, the calibration of the laser power can be critical in producing the desired image. In this regard, in a particular embodiment, laser energy is applied to a calibration portion 130 of the labeling layer 110. In the embodiment illustrated in FIG. 1, the calibration portion 130 is a ring which may include portions of one or more revolutions of a spiral track of laser-sensitive film.

The calibration portion 130 may be located anywhere on the digital medium 130. In one embodiment, the calibration portion 130 is positioned in an inner region of the digital medium 130 so as to minimize interference with the desired final image. Further, prior to calibration, the calibration portion 130 may not be defined on the digital medium. In other words, the calibration portion 130 of the labeling layer 110 is no different than the remainder of the labeling layer 110.

Figure 2:
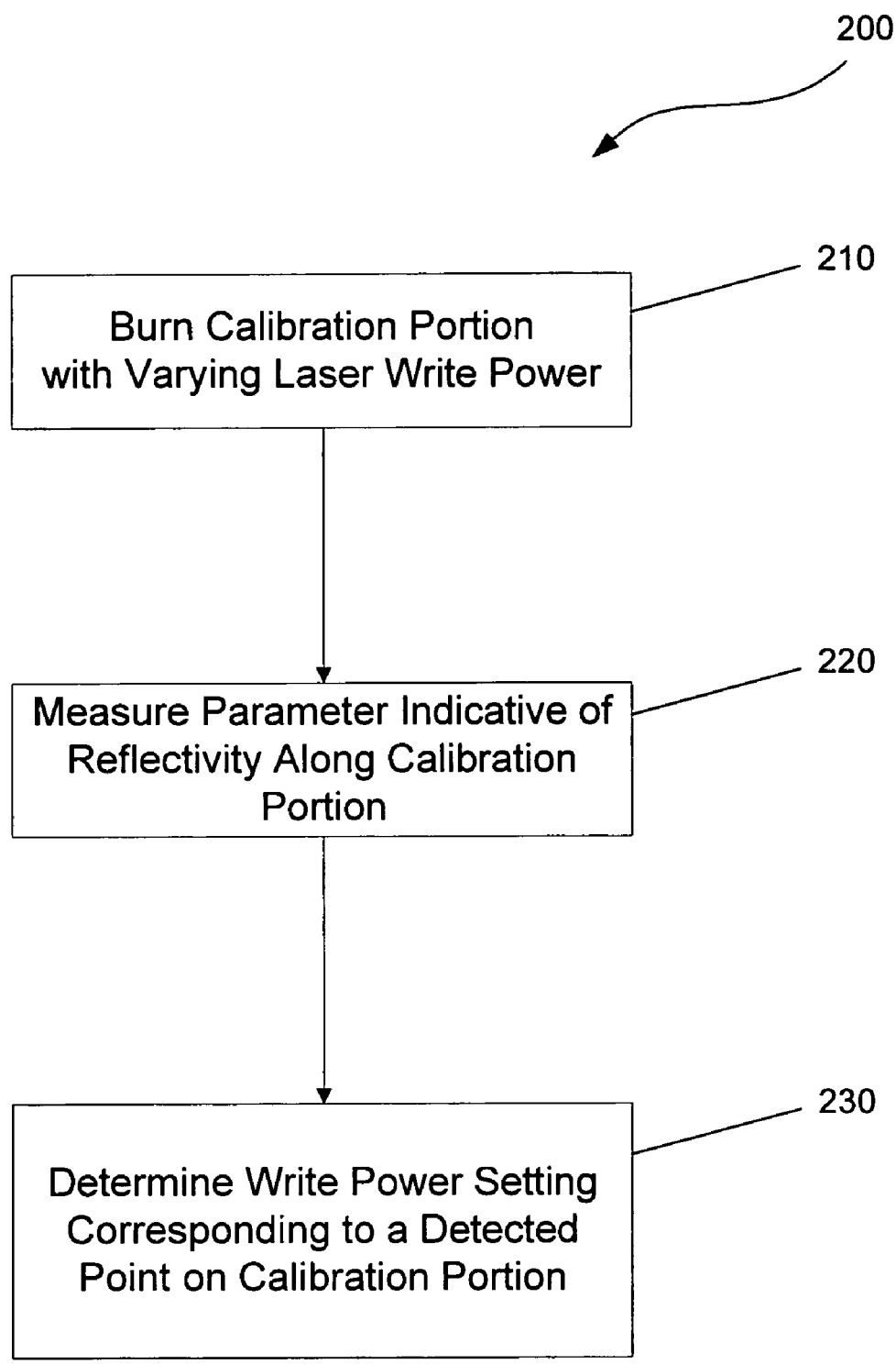
FIG. 2 is a flow chart illustrating an embodiment of a method of calibrating laser write power.
Figure 3:
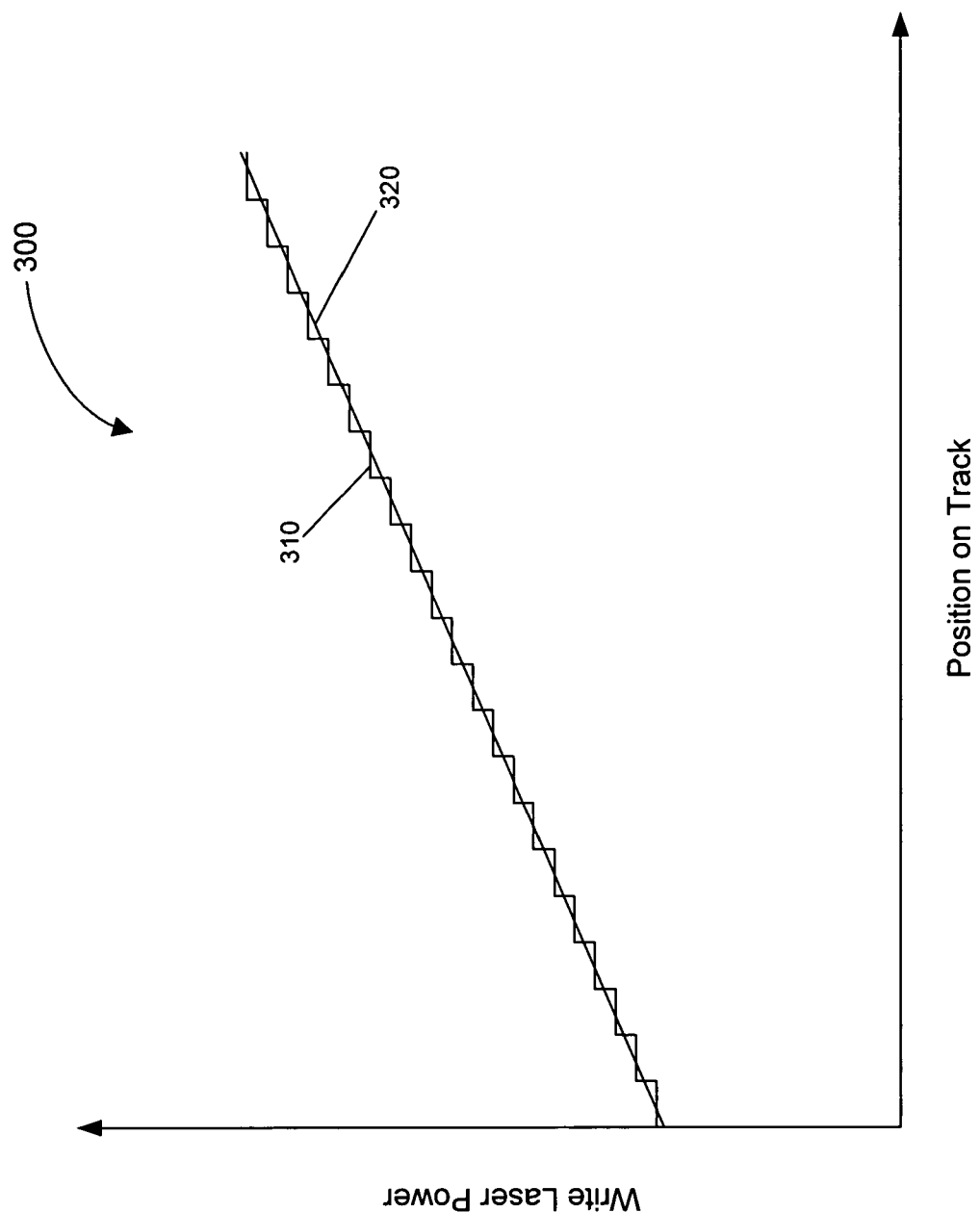
FIG. 3 is a chart illustrating embodiments of laser write power settings for calibration purposes.

FIG. 2 is a flow chart illustrating an exemplary embodiment of a calibration method. The method 200 begins by writing on, or burning, the calibration portion 130 with varying laser write power (block 210). In this regard, the calibration portion 130 is written using at least two different laser power settings. FIG. 3 illustrates exemplary varying laser write power settings used for a calibration portion 130 which includes a portion of a single circular track, for example. In the chart of FIG. 3, the horizontal axis indicates a position on the calibration portion 130, such as a position on the track. The vertical axis indicates the laser power setting used to write on a particular position on the calibration portion 130. Thus, in one embodiment, a step variation profile 310 is applied to the laser power setting for writing on the calibration portion. In another embodiment, a substantially continuous variation profile 320 is applied to the laser power setting. Of course, other laser power setting profiles may also be applied and are contemplated.

The range of laser power settings used for the calibration portion should be large enough to cover a likely range for the calibrated laser power setting. In this regard, the digital media drive including the laser may be pre-calibrated to identify a likely range. In one embodiment, the range includes power settings between 5 and 50 mW.

Referring again to FIG. 2, the method continues to block 220 and measures a parameter indicative of the reflectivity along the calibration portion. In this regard, a reduced-energy laser may be applied to the calibration portion, and a return signal reflected from the labeling layer can be measured. In one embodiment, the reduced-energy laser operates at 1.0 mW. The measurement of the parameter will now be described with reference to FIG. 4.

Figure 4:
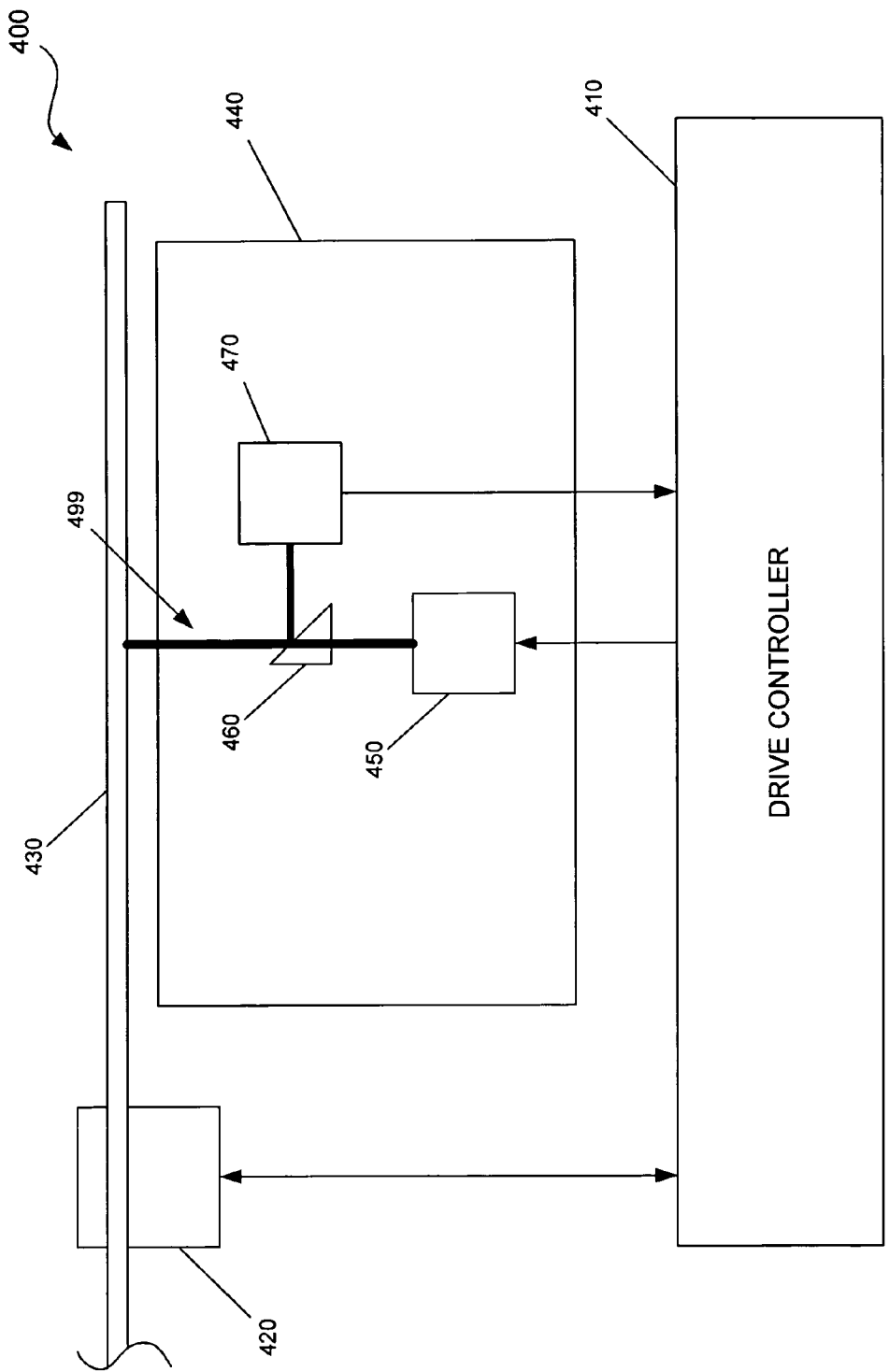
FIG. 4 is a schematic illustration of an embodiment of a system including a digital media drive.

FIG. 4 illustrates a schematic illustration of an embodiment of a system including a digital media drive. The system 400 includes a drive controller 410 adapted to control a spindle motor 420 of the digital media drive. In this regard, the drive controller may include a motor-drive sub-module. The spindle causes a digital medium 430 mounted thereon to spin, exposing the various regions of the digital medium 430 to a laser beam 499.

The system 400 includes an optical module 440 having a laser module 450, a prism 460 to deflect at least a portion of a return signal to a sensor module 470. The laser module 450 may include a laser driver adapted to generate the appropriate laser energy. In one embodiment, the same laser module 450 may be adapted for writing and reading data from the digital medium, as well as for providing laser energy for the labeling layer. Further, the laser module 450 may be configured for a specific digital medium, such as a CD or a DVD.

When laser energy is generated by the laser module 450, a laser beam 499 is directed through the prism 460 to the digital medium 430. At least some of the laser energy is reflected by the digital medium 430, and the reflected energy is at least partially deflected by the prism 460 toward the sensor module 470. The deflected portion of the reflected energy received by the sensor module 470 may be converted to an electrical signal, which is referred to herein as the sum signal. In one embodiment, the sum signal is measured in terms of a voltage level corresponding to an intensity level of the reflected energy. The sum signal detected by the sensor module 470 is then transmitted to the drive controller 410 for processing. In this regard, the drive controller 410 may determine a reflectivity of the labeling layer of the digital medium 430 based on the received sum signal.

Thus, at block 220 of FIG. 2, the reflectivity corresponding to the different laser write power settings used to write on the calibration portion (block 210) can be determined.

Referring again to FIG. 2, the method then continues to block 230 and determines a write power setting corresponding to a detected point on the calibration portion which resulted in the desired reflectivity. In some embodiments, the desired reflectivity is ideally the maximum reflectivity achievable for the labeling layer. Various embodiments of methods of determining the write power setting are described below with reference to FIGS. 5-7.

Figure 5:
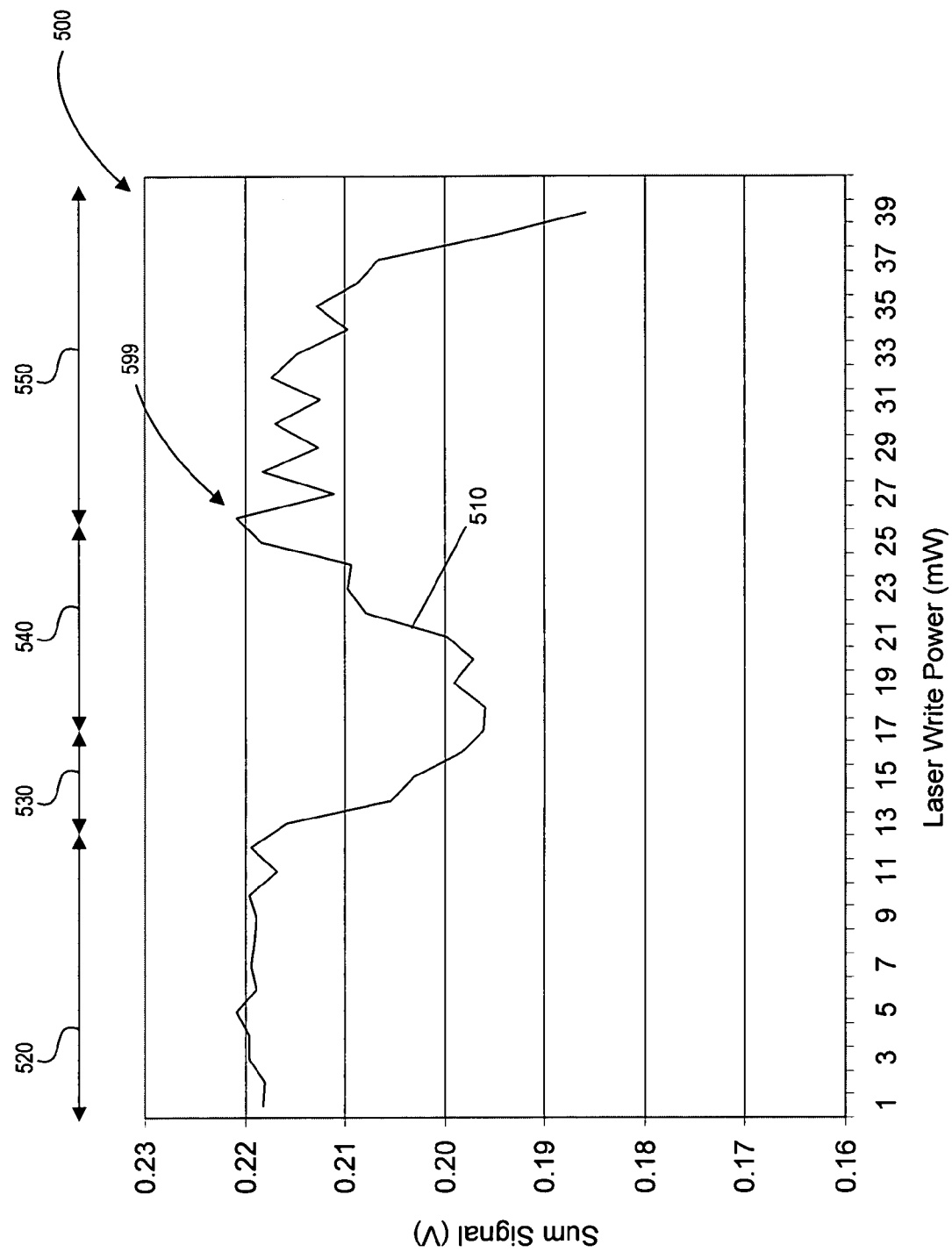
FIG. 5 is a chart illustrating an exemplary reflectivity profile for determining a calibrated laser write power setting.

Referring first to FIG. 5, a chart 500 illustrates an exemplary reflectivity profile 510 for determining a calibrated laser write power setting. The reflectivity profile 510 is the sum signal corresponding to the different laser write power settings used for the calibration portion. The reflectivity profile 510 includes one or more features which may be recognized by the drive controller to determine the desired calibrated laser write power. In the illustrated example, the reflectivity profile 510 includes several regions. The first region 520 includes little or no activation of the labeling layer. Thus, the reflectivity profile in this region is relatively flat at a level corresponding to the reflectivity of the un-activated labeling layer.

The second region 530 of the reflectivity profile 510 is a region where a low-energy laser is applied to the labeling layer. For certain labeling layers, such as those implemented in LightScribe, at low write powers, the reflectivity of the material decreases with increasing write power. Thus, as illustrated by the reflectivity profile 510, the sum signal steadily declines in the second region 530, forming a knee between the first region 520 and the second region 530.

As the laser write power is increased beyond the second region 530, the reflectivity begins to increase, as illustrated in the third region 540. However, if the laser write power is increased too much, the laser energy may burn a trough in the labeling layer or cause ablation of the labeling layer, thereby reducing the reflectivity, as illustrated in the fourth region 550. In this regard, a peak 599 is formed at the transition from the third region 540 to the fourth region 550. It is noted that the sum signal may not be the highest at the peak 599. For example, the sum signal in the first region 520 indicating the reflectivity of the un-activated labeling layer may be higher than the sum signal at the peak 599.

Thus, it is desirable to set the calibrated laser write power at the laser write power corresponding to the sum signal peak 599. This may be achieved by the recognition or detection of one or more features of the reflectivity profile 510, such as the transition from an increasing trend in the third region 540 to a decreasing trend in the fourth region 550, a peak 599 following a decreasing region 530 and an increasing region 540, and the like.

Figure 6:
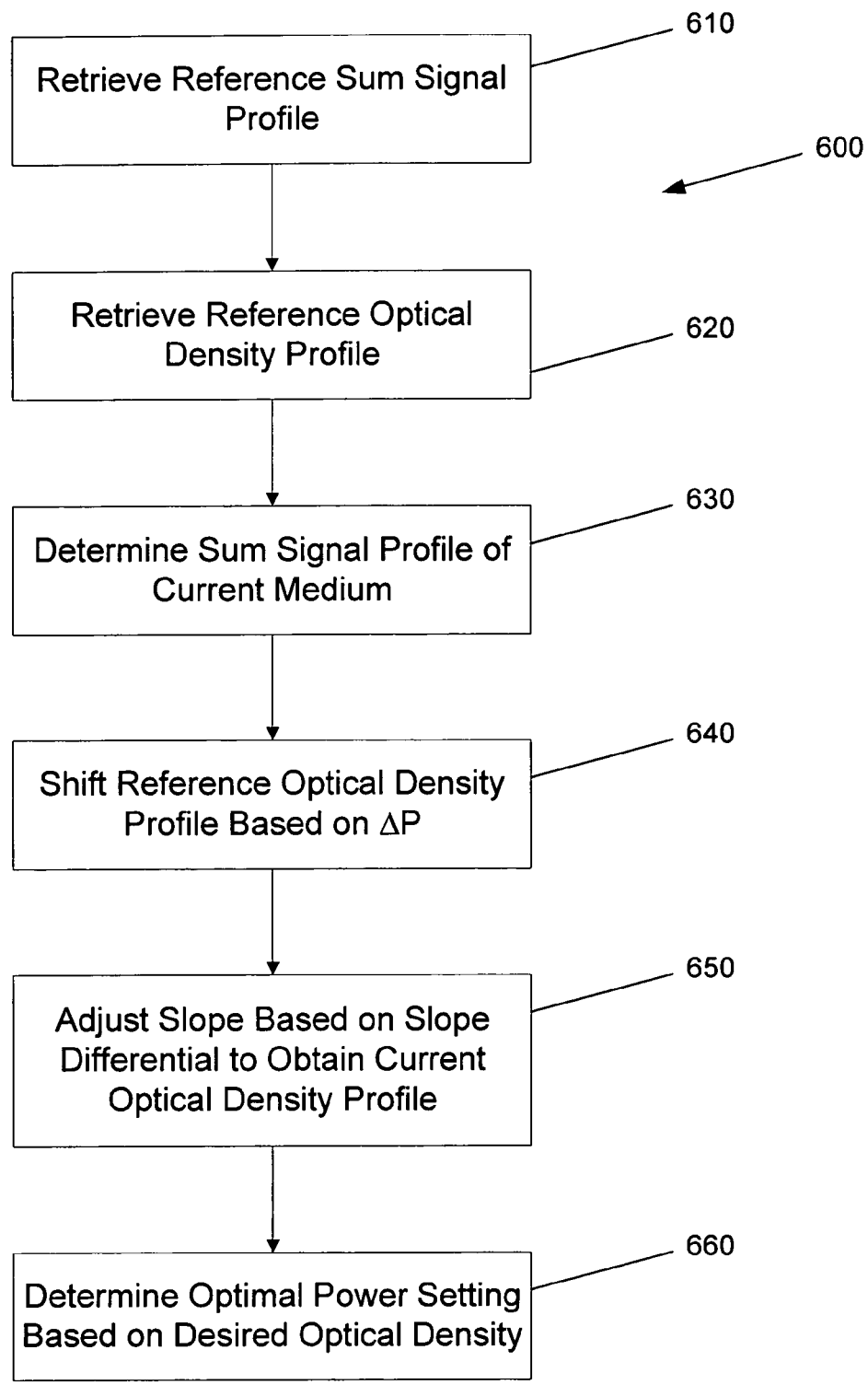
FIGS. 6 and 7 are a flow chart and a chart illustrating an embodiment of a method of determining a calibrated laser write power setting.
Figure 7:
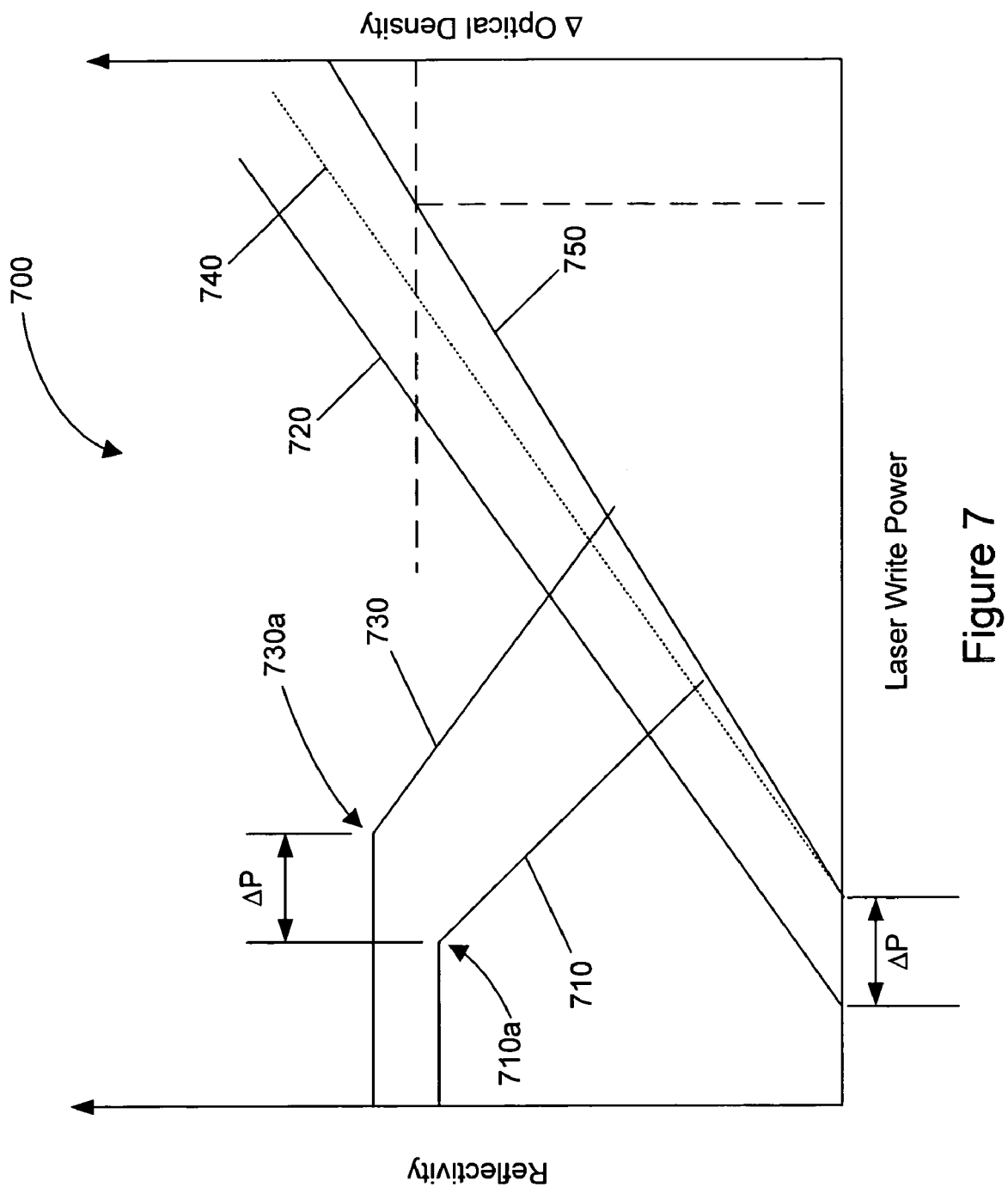

FIGS. 6 and 7 illustrate another embodiment of a method of determining a calibrated laser write power setting. FIG. 6 is a flow chart illustrating the method 600, and FIG. 7 graphically illustrates certain steps of the method 600. The method 600 begins by retrieving a reference sum signal profile (block 610) and a reference optical density profile (block 620). The reference sum signal profile, line 710 in FIG. 7, may be an average of the sum signal profiles of a large number of labeling layers. In one embodiment, between 30 and 40 digital media are used to develop the reference sum signal profile. The reference sum signal profile may be developed using measurements similar to those described above with reference to FIGS. 2 and 4. Measurements of the sum signal may be taken at varying laser write power settings to obtain a sum signal profile for each digital medium, and the profiles for numerous digital media (e.g., 30 to 40) may be averaged to obtain the reference sum signal profile 710.

The change in optical density can be a more accurate measure of the reflectivity of the labeling layer than the sum signal, particularly due to noise in the sum signal beyond the second region (530 in FIG. 5). Optical density is a logarithmic measure of the darkness of an image and represents a more direct measure of the reflectivity of an image. However, optical density is difficult to measure for a specific digital medium within a digital media drive. The method 600 provides for the correlation of a measured sum signal profile to an optical density profile to provide an accurate indicator of reflectivity. The reference optical density profile, line 720 in FIG. 7, corresponds to the reference sum signal profile and may be an average of the optical densities of the labeling layers used to develop the reference sum signal profile. In the above example, the same 30-40 digital media used to develop the reference sum signal profile 710 are used to develop the reference optical density profile 720. In this regard, measurements of optical density for each of the 30-40 digital media may be taken at varying write powers, and the resulting profiles for the 30-40 digital media may be averaged, resulting in the reference optical density profile. The reference sum signal profile and the reference optical density profile can be stored within the digital media drive in, for example, the drive controller 410 of FIG. 4.

Referring again to FIG. 6, at block 630, the sum signal profile of the current digital medium is determined or measured. An exemplary sum signal profile is illustrated in FIG. 7 as line 730. It is noted that the entire sum signal profile illustrated in FIG. 5 is not necessary for the method 600. Sufficient data to determine the location of a knee 730a between the first region (520 of FIG. 5) and the second region (530 of FIG. 5), along with enough data to determine a slope of the second region, provides sufficient information.

At block 640, a temporary optical density profile 740 is obtained by shifting the reference optical density profile 720 by the laser write power difference at the respective knees 710a, 730a of the reference sum signal profile 710 and the current sum signal profile 730. Thus, as illustrated in FIG. 7, the difference (ΔP) in the laser write powers of the knees 710a, 730a is determined, and the reference optical density profile 720 is shifted by ΔP to achieve the temporary profile 740.

The slope of the temporary profile 740 is then adjusted based on the slope differential of the second regions of the reference sum signal profile 710 and the current sum signal profile 730. In this regard, the correlation between the slope differential of the sum signal profiles 710, 730 and the adjustment of the slope of the temporary profile 740 may be determined based on testing for specific digital media. By adjusting the slope of the temporary profile 740, a current optical density profile 750 can be approximated.

Referring again to FIG. 6, at block 660, an optimal laser write power setting is determined based on a desired optical density. Thus, as indicated by the dashed lines in FIG. 7, a laser write power on the approximated current optical density profile 750 is determined corresponding to a desired optical density, thereby providing a desired calibrated laser power setting.

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

What is claimed is:

1. A method of calibrating laser write power, comprising:
   writing to a calibration portion on a digital media labeling layer with energy from a laser, the writing including using at least two different laser power settings within the calibration portion, wherein at least one of the laser power settings is insufficient to activate the labeling layer at a first position within the calibration portion;
   measuring a set of parameters in the calibration portion, each parameter indicative of the reflectivity of the labeling layer at a different position in the calibration portion, wherein the parameter having the largest measured value corresponds to the first position;
   developing a reflectivity profile as a function of laser write power based on the parameter set;
   identifying one or more features of the reflectivity profile, each feature corresponding to a region of the profile and associated with a plurality of the parameters;
   identifying an optimum reflectivity level based on the features; and
   designating a laser write power corresponding to the optimum reflectivity level as a calibrated laser write power setting.

2. The method according to claim 1, wherein the digital media labeling layer includes a laser-sensitive film arranged in one or more racks.

3. The method according to claim 2, wherein the laser-sensitive film is adapted to be activated by energy from the laser.

4. The method according to claim 2, wherein the calibration portion includes at least a portion of a track.

5. The method according to claim 1, wherein the at least two different laser power settings include a plurality of power settings across a predetermined range.

6. The method according to claim 5, wherein the plurality of power settings includes a substantially continuous variation across the predetermined range.

7. The method according to claim 5, wherein the plurality of power settings includes a step variation across the predetermined range.

8. The method according to claim 1, wherein the identifying one or more features of the reflectivity profile comprises identifying a plurality of features, and wherein the identifying a optimum reflectivity level includes identifying the peak reflectivity level based on the plurality of features.

9. The method according to claim 1, wherein the optimum reflectivity level does not correspond to the parameter having the largest reflectivity value.

10. A method of calibrating laser write power, comprising:
    writing to a calibration portion on a digital media labeling layer with energy from a laser, the writing including using at least two different laser power settings within the calibration portion;
    measuring a parameter in the calibration portion, the parameter being indicative of the reflectivity of the labeling layer; and
    determining a calibrated laser write power setting based on the measured parameter and the at least two different laser write power settings,
    wherein the step of determining a calibrated laser write power setting comprises:
      retrieving a reference parameter profile and a corresponding reference optical density profile;
      developing a current parameter profile for the digital media labeling layer based on the measured parameter; and
      obtaining a current optical density profile based on the reference parameter profile, the corresponding reference optical density profile and the current parameter profile.

11. The method according to claim 10, wherein obtaining a current optical density profile comprises:
    manipulating the corresponding reference optical density profile based on differences between the reference parameter profile and the current parameter profile.

12. The method according to claim 11, wherein manipulating the corresponding reference optical density profile comprises:

shifting the corresponding reference optical density profile based on a difference between a laser power corresponding to a predetermined feature of the reference parameter profile and a laser power corresponding to the predetermined feature of the current parameter profile to obtain a temporary profile; and adjusting a slope of the temporary profile based on a difference between a slope of the reference parameter profile and a slope of the current parameter profile to obtain the current optical density profile.

13. The method of claim 10, wherein the calibrated laser write power setting corresponds to a desired optical density of the current optical density profile.

14. A digital media drive, comprising:
a sensor adapted to measure a set of parameters indicative of reflectivity of a calibration portion of a digital media labeling layer having positions written using at least two different laser power settings, each parameter indicative of the reflectivity at a different position, wherein at least one of the laser power settings is insufficient to activate the labeling layer at a first position within the calibration portion; and
a controller in communication with the sensor and adapted to develop a reflectivity profile as a function of laser write power based on the parameter set, identify one or more features of the reflectivity profile, each feature corresponding to a region of the profile and associated with a plurality of the parameters, identify an optimum reflectivity level based on the features, and designate a laser write power corresponding to the optimum reflectivity level as a calibrated laser power setting, wherein the parameter having the largst measured value corresponds to the first position.

15. The digital media drive according to claim 14, further comprising:
a laser adapted to apply energy to the digital media labeling layer, the energy being in accordance with the calibrated laser power setting determined by the controller.

16. A computer-readable medium comprising machine readable program code for causing a machine to perform a method comprising:
writing to a calibration portion on a digital media labeling layer with energy from a laser, the writing including using at least two different laser power settings within the calibration portion, wherein at least one of the laser power settings is insufficient to activate the labeling layer at a first position within the calibration portion;
measuring a set of parameters in the calibration portion, each parameter indicative of the reflectivity of the labeling layer at a different position in the calibration portion, wherein the parameter having the largest measured value corresponds to the first position;
developing a reflectivity profile as a function of laser write power based on the parameter set;
identifying one or more features of the reflectivity profile, each feature corresponding to a region of the profile and associated with a plurality of the parameters;
identifying an optimum reflectivity level based on the features; and
designating a laser write power corresponding to the optimum reflectivity level as a calibrated lair write power setting.

17. A computer-readable medium comprising machine readable program code for causing a machine to perform a method comprising:
writing to a calibration portion on a digital media labeling layer with energy from a laser, the writing including using at least, two different laser power settings within the calibration portion;
measuring a parameter in the calibration portion, the parameter being indicative of the reflectivity of the labeling layer; and
determining a calibrated laser write power setting based on the measured parameter and the at least two different laser write power settings,
wherein the step of determining a calibrated laser write power setting comprises:
retrieving a reference parameter profile and a corresponding reference optical density profile;
developing a current parameter profile for the digital media labeling layer based on the measured parameter; and
obtaining a current optical density profile based on the reference parameter profile, the corresponding reference optical density profile and the current parameter profile.

18. The medium according to claim 17, wherein obtaining a current optical density profile comprises:
manipulating the corresponding reference optical density profile based on differences between the reference parameter profile and the current parameter profile.

19. The medium according to claim 18, wherein manipulating the coi-responding reference optical density profile comprises:
shifting the corresponding reference optical density profile based on a difference between a laser power corresponding to a predetermined feature of the reference parameter profile and a laser power corresponding to the predetermined feature of the current parameter profile to obtain a temporary profile; and
adjusting a slope of the temporary profile based on a difference between a slope of the reference parameter profile and a slope of the current parameter profile to ohtain the current optical density profile.

20. The medium of claim 17, wherein the calibrated laser write power setting corresponds to a desired optical density of the current optical density profile.

21. A method of calibrating laser write power, comprising:
writing to a calibration portion on a digital media labeling layer with energy from a laser, the writing including using at least two different laser power settings within the calibration portion, wherein at least one of the laser power settings is insufficient to activate the labeling layer at a first position within the calibration portion;
measuring a set of parameters in the calibration portion, each parameter indicative of the reflectivity of the labeling layer at a different position in the calibration portion, wherein the parameter having the largest measured value corresponds to the first position;
developing a reflectivity profile as a function of laser write power based on the measured parameter set;
identifying one or more features of the reflectivity profile;
identifying an optimum reflectivity level in the profile based on the features, wherein the optimum reflectivity level does not correspond to the parameter having the largest measured value; and
designating a laser write power corresponding to the optimum reflectivity level as the calibrated laser write power setting.

22. The method according to claim 21, wherein the optimum reflectivity level corresponds to a second position within the calibration portion at which the labeling layer is activated.

* * * * *

UNITED STATES PATENT AND TRADEMARK OFFICE
CERTIFICATE OF CORRECTION

| | | |
|---|---|---|
| PATENT NO. | : 7,701,479 B2 | Page 1 of 1 |
| APPLICATION NO. | : 11/016099 | |
| DATED | : April 20, 2010 | |
| INVENTOR(S) | : Kevin L. Colburn et al. | |

It is certified that error appears in the above-identified patent and that said Letters Patent is hereby corrected as shown below:

In column 6, line 14, in Claim 2, delete "racks." and insert -- tracks. --, therefor.

In column 6, line 33, in Claim 8, delete "peak" and insert -- optimum --, therefor.

In column 7, line 30, in Claim 14, delete "largst" and insert -- largest --, therefor.

In column 7, line 58, in Claim 16, delete "lair" and insert -- laser --, therefor.

In column 7, line 65, in Claim 17, delete "least," and insert -- least --, therefor.

In column 8, line 24, in Claim 19, delete "coi-responding" and insert -- corresponding --, therefor.

In column 8, line 34, in Claim 19, delete "ohtain" and insert -- obtain --, therefor.

Signed and Sealed this

Thirty-first Day of August, 2010

David J. Kappos
*Director of the United States Patent and Trademark Office*